(12) United States Patent
Zimmermann et al.

(10) Patent No.: US 10,693,727 B2
(45) Date of Patent: Jun. 23, 2020

(54) NON-INTRUSIVE DEVICE DISCOVERY AND CONFIGURATION CLONING

(71) Applicant: ZPE Systems, Inc., Fremont, CA (US)

(72) Inventors: Arnaldo Zimmermann, Dublin, CA (US); Livio Ceci, Fremont, CA (US)

(73) Assignee: ZPE SYSTEMS, INC., Fremont, CA (US)

(*) Notice: Subject to any disclaimer, the term of this patent is extended or adjusted under 35 U.S.C. 154(b) by 74 days.

(21) Appl. No.: 14/508,572

(22) Filed: Oct. 7, 2014

(65) Prior Publication Data

US 2016/0105317 A1 Apr. 14, 2016

Related U.S. Application Data

(60) Provisional application No. 61/890,316, filed on Oct. 13, 2013, provisional application No. 61/890,317, filed on Oct. 13, 2013.

(51) Int. Cl.
*H04L 12/24* (2006.01)
*H04L 29/08* (2006.01)
*H04L 29/06* (2006.01)
*G06F 9/451* (2018.01)
*G06F 9/455* (2018.01)

(52) U.S. Cl.
CPC ........ *H04L 41/0846* (2013.01); *G06F 9/452* (2018.02); *G06F 9/45533* (2013.01); *H04L 41/0893* (2013.01); *H04L 41/12* (2013.01); *H04L 67/16* (2013.01); *H04L 41/0816* (2013.01); *H04L 63/0227* (2013.01)

(58) Field of Classification Search
CPC . H04L 41/0846; H04L 67/16; H04L 41/0893; H04L 41/12; H04L 63/0227; H04L 41/0816; G06F 9/4445; G06F 9/45533
See application file for complete search history.

(56) References Cited

U.S. PATENT DOCUMENTS

| | | | |
|---|---|---|---|
| 6,950,394 B1* | 9/2005 | Chou | H04L 45/00 370/229 |
| 7,451,224 B1* | 11/2008 | Stamler | H04L 41/0846 709/228 |
| 7,478,145 B2* | 1/2009 | Braun | H04L 41/12 709/220 |
| 8,086,760 B1* | 12/2011 | Gruttadauria | H04L 69/16 710/16 |
| 8,219,665 B2* | 7/2012 | Backman | H04L 41/0803 709/224 |
| 8,732,859 B2* | 5/2014 | Hlavac | H04L 41/12 713/172 |
| 8,775,579 B2* | 7/2014 | Yu | H04L 41/0206 707/E17.014 |
| 9,188,669 B2* | 11/2015 | Hino | G01S 13/06 |

(Continued)

*Primary Examiner* — Uzma Alam
(74) *Attorney, Agent, or Firm* — Horizon IP Pte. Ltd.

(57) ABSTRACT

Infrastructure management device(s) may discover IT device(s) communicatively connected over a network. IT device information may be determined for at least one of the IT device(s). Configuration rule(s) compatible with IT device information may be matched to IT device(s). Action (s) may be performed on one or more device inventories, determined at least in part, by the configuration rule(s). Feature gap(s) for IT device(s) may be determined. IT device neutral user interface command(s) may be created.

20 Claims, 11 Drawing Sheets

(56) References Cited

U.S. PATENT DOCUMENTS

| | | | | |
|---|---|---|---|---|
| 9,456,328 | B2* | 9/2016 | Lambert | H04W 8/005 |
| 9,778,953 | B2* | 10/2017 | Aiken | H04L 63/10 |
| 2003/0069960 | A1* | 4/2003 | Symons | H04L 41/085 |
| | | | | 709/224 |
| 2004/0003076 | A1* | 1/2004 | Hishimoto | H04L 41/046 |
| | | | | 709/223 |
| 2004/0078066 | A1* | 4/2004 | Ohta | G06F 21/10 |
| | | | | 607/60 |
| 2004/0133689 | A1* | 7/2004 | Vasisht | H04L 29/12216 |
| | | | | 709/228 |
| 2006/0101506 | A1* | 5/2006 | Gallo | G06Q 20/341 |
| | | | | 726/3 |
| 2006/0158343 | A1* | 7/2006 | Lee | H04L 12/2803 |
| | | | | 340/9.1 |
| 2008/0270566 | A1* | 10/2008 | Lipinski | G06Q 10/10 |
| | | | | 709/216 |
| 2009/0031299 | A1* | 1/2009 | Karstens | G06F 8/63 |
| | | | | 717/177 |
| 2009/0106256 | A1* | 4/2009 | Safari | G06F 11/1433 |
| 2009/0311963 | A1* | 12/2009 | Haverty | H04K 3/226 |
| | | | | 455/63.1 |
| 2010/0027444 | A1* | 2/2010 | Lin | H04W 12/08 |
| | | | | 370/254 |
| 2010/0046395 | A1* | 2/2010 | Sivaramakrishna Iyer | H04L 41/12 |
| | | | | 370/254 |
| 2010/0235869 | A1* | 9/2010 | Zhao | G06F 21/10 |
| | | | | 725/82 |
| 2013/0238795 | A1* | 9/2013 | Geffin | G06F 1/206 |
| | | | | 709/224 |
| 2014/0066193 | A1* | 3/2014 | Hollis | G07F 17/3241 |
| | | | | 463/29 |
| 2016/0041837 | A1* | 2/2016 | Rangayya | G06F 9/45558 |
| | | | | 718/1 |

* cited by examiner

| Order {231} | Rule Name | Discovery Process | Host or VM Identifier {234} | Lookup pattern {235} | Clone from | Action {237} |
|---|---|---|---|---|---|---|
| ☐ 1.0 | AllManagers-Deny | DHCP | Manager | | | Discard |
| ☐ 1.1 | Security_SP's | DHCP | | 00:25:90 | Security-IPMI | Clone/Update } 202 |
| ☐ 1.2 | Security_UCS | DHCP | | 00:22:BD:D7:A9:34 | Security-UCS | Clone/Update |
| ☐ 2.0 | Engineering-vSPC | VM Serial | | Develop | Engineering-VM | Clone/Update |
| ☐ 3.0 | Engineering-DevVM | VM Manager | Eng | Eng | Engineering-VM | Clone/Update |
| ☐ 3.1 | Marketing Blocked | VM Manager | | Marketing Confidential | | Discard } 206 |
| ☐ 3.2 | MarketingMKS | VM Manager | Mkt | Marketing | Marketing-VM | Clone/Update } 207 |
| ☐ 4.0 | Eng_Serial | Console Server | Eng | | SerialPort_PDU | Clone/Update |
| ☐ 4.1 | IT_Serial | Console Server | IT_Serial | | SerialPort_PDU | Clone/Update } 209 |
| ☐ 4.2 | DefaultSerial | Console Server | | 40-42 | SerialPort_PDU | Clone/Update |

FIG. 2

NON-INTRUSIVE DEVICE DISCOVERY AND CONFIGURATION CLONING

CROSS-REFERENCE TO RELATED APPLICATIONS

This application claims the benefit of U.S. Provisional Application No. 61/890,316, filed Oct. 13, 2013 and U.S. Provisional Application No. 61/890,317, filed Oct. 13, 2013, which are hereby incorporated by reference in their entirety.

BACKGROUND

In data centers, the inherently dynamic inventory changes of the Information Technology ("IT") devices (e.g. virtual in combination with physical and software in combination with physical: compute nodes, networking nodes, storage nodes, power nodes, cooling nodes) have created a data center environment in which significant overhead in tracking inventory updates (e.g. new addition of IT devices or changes on existing IT devices) may often exist. Some of the various techniques to work around this problem usually require: (1) installing software agents on an IT device's Operating System ("OS"); (2) scanning and inquiring devices on a whole network; and (3) checking devices for possible changes. Addressing this overhead without requiring an add-on agent on the OS and without demanding networking bandwidth required by scanning probes may allow the system administrators of data centers to maintain control of the IT devices changes without having to spend unnecessary time and resources. However, there has been an inability to dynamically and non-intrusively detect these inventory changes associated with the data center IT devices, and for example, IT devices that have changed their configuration. Invariably, system administrators may have to add IT devices manually to infrastructure management systems and system administrators may be unaware of the need for inventory updates thereafter, breaking the usability and effectiveness of the infrastructure management systems.

Additionally, various IT devices, such as IT devices by various vendors, may have different feature set implementation and different functionalities. The combination of diverse user interfaces, network protocols, and feature set deviations and gaps may be difficult to manage.

BRIEF DESCRIPTION OF THE SEVERAL VIEWS OF THE DRAWINGS

FIG. 2 is a diagram showing example combinations of matching rules that may be employed in the identification, creation and/or updating of an IT device in an infrastructure management system according to some of the various embodiments of the present invention.

DETAILED DESCRIPTION OF EMBODIMENTS

Figure 1:
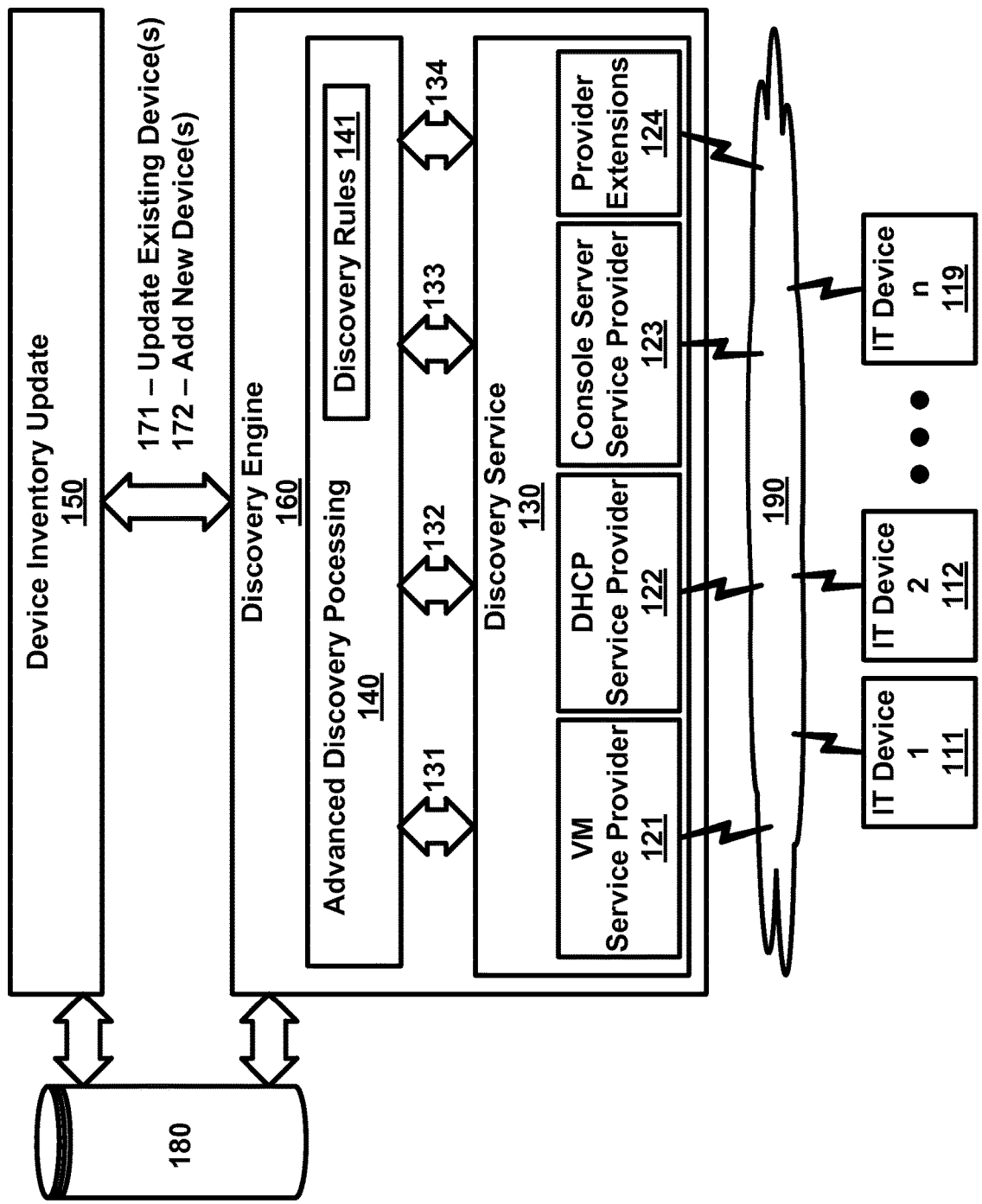
FIG. 1 is a block diagram representation showing example components that may be involved in various functional layers of device discovery in a data center according to some of the various embodiments of the present invention.

Some of the various embodiments of the present invention relate to infrastructure management systems, and more particularly to a data center infrastructure management device(s) configured to process network communication of data center component(s). Various embodiments relate to a data center infrastructure configured to process network communication from data center component(s) (e.g. IT devices) and use personality identification from the network communication to identify and add or update the information of the data center component(s) in an infrastructure management system inventory database for future management, configuration, monitoring, control and remote access of data center component(s).

A device is a machine or component that attaches to a computer and/or computer network. Examples of devices include disk drives, printers, displays, mice, and modems. These particular devices fall into the category of peripheral devices because they may be separate from a main computer. Other example devices may be non-peripheral devices such as IT devices. Many devices, whether peripheral or not, may employ a program called a device driver that acts as a translator, converting general commands from an application into specific commands that the device understands.

An IT device is an "Information Technology" device related to computing technology, comprising, but not limited to: data center devices, networking devices, hardware devices, software operating in combination with a hardware IT device, Internet devices, and/or the like. Some IT devices may employ virtual devices operating on specially configured hardware. Additional examples of IT devices include compute nodes, networking nodes, storage nodes, power nodes, cooling nodes, combinations thereof, and/or the like.

A virtual device may employ a software virtual device driver operating on a properly configured hardware computing device that emulates hardware and other devices so that multiple applications may, for example, access hardware interrupt channels, hardware resources and memory without causing conflicts. Computer hardware may require communication and control processes for devices and/or hardware components to access each other in a controlled manner. These processes may be defined as device drivers, which may comprise code that an application may employ to access hardware or external software resources. Some example virtual devices may be configured for use in multitasking operating systems. In such an example, a device driver may be controlled by an operating system's virtual device driver manager and shared by applications running within that kernel. A virtual device driver may pass interrupt and memory requests through the kernel, which in turn may allocate resources as required.

An agent may comprise a computer program that acts for a user or other program in a relationship of agency, which derives from the Latin agere (to do): an agreement to act on one's behalf. Such "action on behalf of" implies the authority to decide which, if any, action is appropriate. Some agents may comprise, but are not limited to: intelligent agents (in particular exhibiting some aspect of artificial intelligence, such as learning and reasoning), autonomous agents (capable of modifying the way in which the agent achieves objectives), distributed agents (being executed on physically distinct computers), multi-agent systems (distributed agents that do not have the capabilities to achieve an objective alone and thus must communicate), and mobile agents (agents that can relocate their execution onto different processors).

Some of the various embodiments discover virtual (in combination with configured hardware) and/or physical IT devices such as compute nodes, networking nodes, storage nodes, power nodes, cooling nodes, other IT devices, combinations thereof, and/or the like. An infrastructure management system may be automatically updated to add and/or update discovered IT devices—based on IT device type, protocol requirements, discovery rules, existing IT device(s) already added in the system, combinations thereof, and/or the like. Configuration cloning may be employed in the adding and/or updating of IT device(s).

The nature of the interaction between infrastructure management systems and IT devices may be regulated by the type of device itself to dictate network protocols natively supported by the IT device. The type of IT devices may also be used to identify a class or type of discovery rules that may apply for the IT devices available in the network.

FIG. 1 is a block diagram representation showing example components that may be involved in various functional layers of device discovery in a data center according to some of the various embodiments of the present invention. With reference to FIG. 1, each group of IT devices (111, 112 . . . 119) may have different connection requirements based on their native network protocols (e.g. a virtual machine host running on a specially configured hardware platform may have connection requirements that are different from physical rack servers, blade servers, combinations thereof, and/or the like). Therefore a combination of: 1) IT device type; 2) protocol requirements; 3) discovery rules; 4) existing IT devices already added in the system; and 5) combinations thereof, and/or the like may be employed to build process(es) for IT device detection and configuration cloning on the infrastructure management system. Once a specific personality identification is learned from an IT device, specific personality identification information may be used to create a tailored connection for that specific IT device based on the process used for IT device detection. This may eliminate the need for manually adding and/or updating the infrastructure management system resulting in a reduction of time and resources, while keeping the infrastructure management system in synchronism with dynamic changes happening in a network. In other words, embodiments of the present invention may be configured to improve the operational efficiency of a data center.

Example FIG. 1 is a block diagram illustrating one of various embodiments where, for example, a discovery engine 160 is employed for discovery of IT devices (111, 112 . . . 119) that are interconnected on a network 190. The network 190 may comprise physical and/or virtual nodes (e.g. compute nodes, networking nodes, storage nodes, power nodes, cooling nodes—not limited to this list). Virtual nodes may be comprised of, for example, nodes operating in a Virtual Machine operating on a configured computing hardware. IT devices (111, 112 . . . 119) may request connection and configuration via network protocols once they are powered on or from time to time (e.g. a periodic basis) according to their protocol specifications. Since these on-demand requests may be initiated by the IT devices (111, 112 . . . 119), they may be a passive process from the point of view of the infrastructure management system. The information on the IT device configuration request may be collected by the Discovery Service 130 (e.g. Virtual Machine Service Provider 121, Dynamic Host Configuration Protocol (DHCP) Service Provider 122, and/or other providers) and treated as the personality identification of each IT device (111, 112 . . . 119). Alternatively, the Discovery Service 130 (e.g. Console Server Service Provider 123, Virtual Machine Service Provider 121, Provider Extensions 124 and/or other providers) may also collect the IT device Personality Identification by polling the information from time to time (e.g. on a periodic basis). In this scenario, the polled IT device may also be a concentrator of additional child IT devices and the information collected from the polled IT device may contain a collection of IT device Personality Identification from children IT devices. This mechanism may provide a more efficient and bulk discovery process. For example (but not limited to), a Console Server IT device may provide information on IT devices connected on its serial ports. Similarly, a Virtual Machine hypervisor may provide information on Virtual Machines running on that system. Examples of IT Device Personality Identification comprise, but are not limited to: 1) Virtual Machines IT Device Personality Identification 131—universally unique identifier (UUID), VM name, Hypervisor internet protocol (IP) address, Group/Community, and/or the like; 2) physical machine IT Device Personality Identification 132—IP address, media access control address (MAC address), Hostname, and/or the like; 3) Console Server IT Device Personality Identification 133—Serial port range, Hostname, and/or the like; 4) Provider Extensions IT Device Personality Identification 134; and/or the like. IT device Personality Identification may be evaluated by advanced discovery processing 140 against discovery rules 141 in the system. Discovery rules 141 may use a combination of logic of parameters, such as, for example, AND/OR logic. A matching criteria may be based on partial parameters and/or full parameters inspected against the IT device Personality Identification. An action, such as an update existing device action 171, an add new device action 172, and/or the like may be taken in combination with, for example, a device inventory update module 150 upon a successful match between one or more of the Discovery Rules 141 and IT Device Personality (e.g. 131, 132, 133, 134, and/or the like). Examples of actions may comprise, but are not limited to: 1) clone configuration from an existing device; 2) update configuration if an IT device already exists and if changes are required; 3) deny clone, which means no response may be given to the IT device from the system (this allows supporting multiple discovery systems in the same network); and/or the like. Additionally, a Non-Volatile Memory 180 may hold for example IT device inventory data for a newly added IT device; changes or updates on existing IT device(s); information on existing IT device(s) that may be used on cloning process; combinations thereof, and/or the like.

Figure 3:
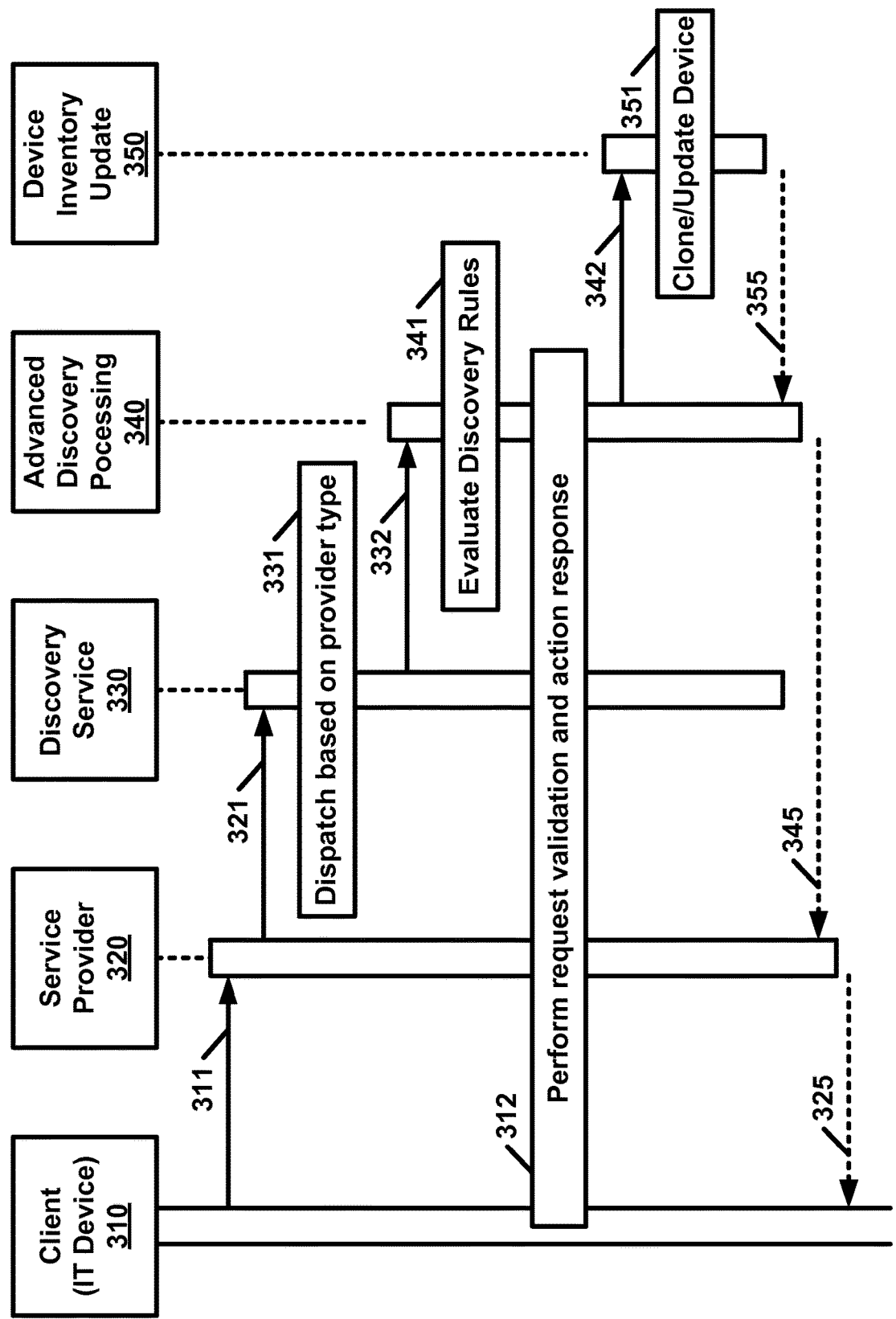
FIG. 3 is an example flow diagram illustrating one of the various techniques for the discovery of an IT device communicating with the infrastructure management system according to some of the various embodiments of the present invention

A flow diagram for an example discovery method is represented in FIG. 3. Communication may be driven by, for example, an IT device 310 or initiated by a Service Provider 320. In both scenarios, the infrastructure management system may collect information 311 about IT device 310 without sending network package broadcasts, making the discovery of the IT device Personality Identification non-intrusive and efficient. Alternatively, Service Provider 320 may also poll information 311 from IT device 310. The Personality Identification 321 of IT device 310 may provide information about the device and service provider type 331. This information may be used by Discovery Service 330 to determine where to dispatch 332 the Personality Identification 321. The Advanced Discovery Processing 340 may use the Personality Identification 321 of the IT device 310 to evaluate discovery rules 341. Based on the evaluation results, the Advance Discovery Processing 340 may perform request validation and action response 312 during the several phases 355, 345 and 325 of the discovery process. Action requests 342 may be processed by Device Inventory Update 350 in order to (but not limited to) Clone or Update Device 351.

In example FIG. 2, row 202 shows an example of a rule for partial physical MAC address inspection with an associated action (row 202, column 237) to clone from an existing server when a match is found. On this simple rule example, no other parameter may be evaluated. A match may be found whenever a physical MAC address of an IT device requesting connection starts with the same 3-first octets from this rule (row 202, column 235). In this case, the Personality Identification of the IT device may be used to find an existing IT device (clone from) already registered in the device inventory in order to ADD the newly discovered IT device under the same category (e.g. same configuration, authorization, authentication, access control, access rights, management options, group names and other relevant parameters—not limited only to this list). This may allow system administrators to maintain consistency on groups of IT devices alike, without having to spend unnecessary time and resources. If the matching IT device already exists in the device inventory, then the Personality Identification may be used to UPDATE the information about the IT device in the device inventory. A conflict resolution may be invoked to address possible exceptions. Likewise, a rule may be created to DENY the connection request from the IT device as the example shown on FIG. 2, row 206. This may be particularly useful in order to support multiple discovery systems in the same network, where other systems may have complementary rules and more.

Another example of a discovery process is illustrated in row 209 of example FIG. 2. In this case, a Console Server discovery process may look for child IT devices attached to all serial ports of the Console Server IT device. Similarly, on row 207, a VM Manager discovery process may look for child virtual machines discovered from hypervisors. In the Console Server case, the matching criteria may be the partial substring shown under "Host or VM Identifier" field (row 207, column 234). Whenever a child IT device from a Console Server has under the Personality Identification (e.g. serial port name) the same substring present on the discovery rule, a match may be found. In the VM Manager case, the matching criteria may be the partial substring shown under "Host or VM Identifier" field (row 207, column 234) and/or the substring under "Lookup Pattern" field (row 207, column 235). Whenever a virtual machine from the hypervisor has under the Personality Identification (e.g. VM name, Datacenter, Cluster) the same substring present on the discovery rule, a match may be found. In both example cases, these rules may allow the system to categorize IT devices together irrespective of their console server manufacturers or hypervisor brand. Likewise, the matching IT device may be ADDED or UPDATED as required.

Figure 4:
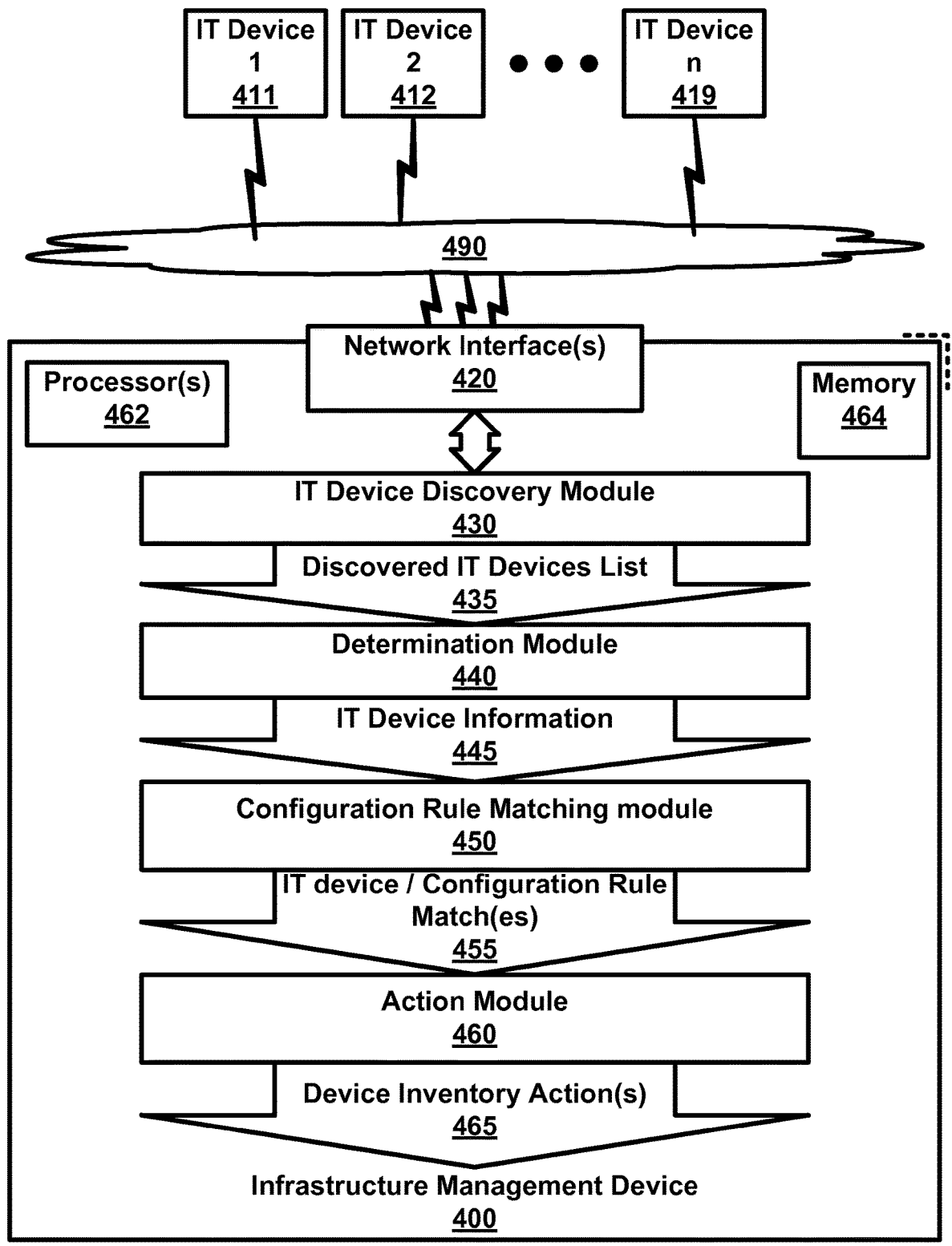
FIG. 4 is an example block diagram of an infrastructure management device according to some aspects of various embodiments of the present invention.
Figure 5:
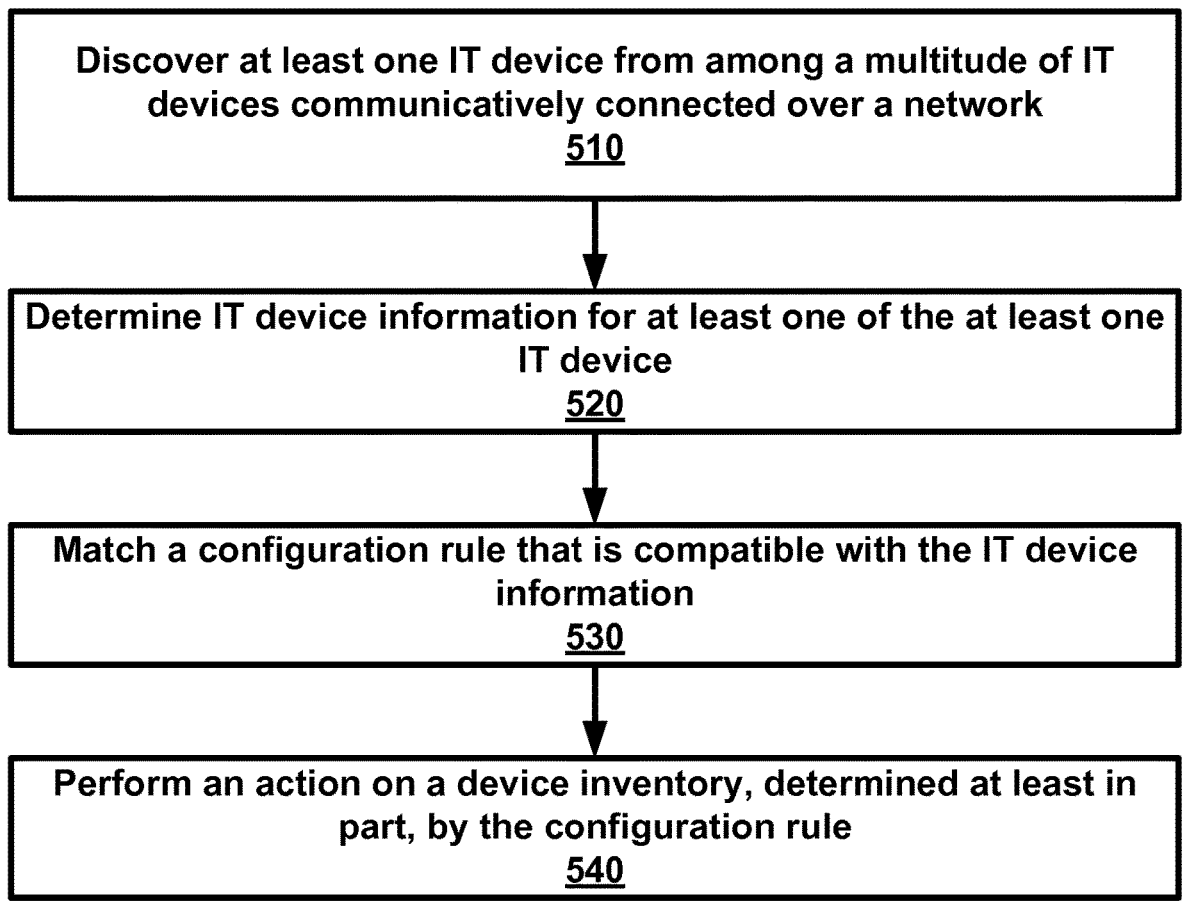
FIG. 5 is an example flow diagram of device discovery and configuration according to some aspects of various embodiments of the present invention.

FIG. 4 is an example block diagram of an infrastructure management device 400 according to some aspects of various embodiments of the present invention. FIG. 5 is an example flow diagram of device discovery and configuration according to some aspects of various embodiments of the present invention.

Some of the various embodiments may comprise an infrastructure management device 400. The infrastructure management device 400 may comprise at least one processor 462, memory 464, network interface(s) 420 and other supporting hardware (e.g. electronic communications busses, controllers, non-transitory tangible machine readable medium readers, and/or the like). The memory 464 may comprise a non-transitory tangible machine readable medium. The non-transitory tangible machine readable medium may comprise instructions configured to cause at least one processor 462 to perform a process of IT device discovery and configuration. The network interface(s) 420 may be configured to communicate with a multitude of IT devices (411, 412 . . . 419) over a network 490. Network 490 may comprise, but is not limited to: the Internet, an intranet, a connection to the Internet, a private cloud, interconnected data centers, a multi-nodal network, two or more computing devices connected using a Virtual Private Network, an on-premise network, a combination thereof, and/or the like.

The infrastructure management device 400 may comprise a multitude of infrastructure management devices 400 configured to cooperatively operate together. Examples of an infrastructure management device 400 may comprise, but are not limited to: a server, a compute node, a router, a switch, a firewall, a load balancer, a networking node, a storage node, a power node, a cooling node, a network appliance, a virtual appliance, system hardware with network access, a hosted module within a system, and/or the like. According to some of the various embodiments, infrastructure management device(s) may comprise a virtual machine running on a hardware computing device and acting as at least one of the following: a server, a compute node, a router, a switch, a firewall, a load balancer, a networking node, a storage node, a power node, a cooling node, a network appliance, a virtual appliance, system hardware with network access, a hosted module within a system, and/or the like.

According to some of the various embodiments, IT device(s) (411, 412 . . . 419) may comprise at least one of the following: a server, a compute node, a router, a switch, a firewall, a load balancer, a networking node, a storage node, a power node, a cooling node, a network appliance, a virtual appliance, system hardware with network access, a hosted module within a system, a combination thereof, and/or the like.

At least one IT device may be discovered from among a multitude of IT devices (411, 412 . . . 419) communicatively connected over a network 490 at block 510. This discovery may be performed by, for example, an IT device discovery module 430. The discovered IT devices may be enumerated in a discovered IT devices list 435. The discovered IT devices list 435 may be part of an IT devices inventory. The discovery of IT device(s) may be performed in numerous ways according to various embodiments. For example, an IT device may be discovered by listening to a communication from the at least one IT device, listening to an DHCP request from the at least one IT device, interacting with a communications processor associated with at least one IT device, interacting with a communications processor disposed within at least one IT device, interacting with a virtual machine hypervisor, interacting with a console server, interacting with a terminal server, interacting with an agent, interacting with a Configuration Management Database (CMDB) system, interacting with a data store system, interacting with another infrastructure management device, a combination of the above, and/or the like.

Discovery may define classes of communication methods, protocols and process used to discover the IT devices connected over a network. Discovery may also, according to some of the various embodiments, be employed to identify possible mechanisms to interact back with IT device(s). Examples include, but are not limited to: DCHP protocol, virtual machine serial port via vSPC configuration from VMware, virtual machine serial port via hypervisor's application-programming interface (API), virtual machine from hypervisor's application-programming interface (API), console server and ports via SSH or Telnet.

Discovery may comprise determining if another of the multitude of IT devices (411, 412 . . . 419) operates using a similar protocol. A protocol may comprise a system of digital rules for the exchange of data within or between computers. The rules may define format(s) for exchanging messages where some messages are configured to elicit a response from a range of possible responses pre-determined for that particular situation. A protocol may define the syntax, semantics, and synchronization of communication. Some specified behaviors may be independent of how an interface is implemented. A protocol may be implemented as hardware, software, or both. Some of the various communications protocols may be implemented according to one or more technical standards from organizations such as, but not limited to, the International Organization for Standardization (ISO), the International Telecommunications Union (ITU), the Institute of Electrical and Electronics Engineers (IEEE), and the Internet Engineering Task Force (IETF).

Discovery, according to some of the various embodiments, may further comprise determining if another of the multitude of IT devices (411, 412 . . . 419) operates using a similar communication profile. Yet other discovery may comprise determining if another of the multitude of IT devices are the same class of IT device.

IT device information may be determined for at least one of the at least one IT device at block 520. This IT device information 445 may be determined by, for example, determination module 440. IT device information may comprise a set of data associated to an IT device that enables characteristics of the IT device which are useful for IT device classification and interaction to be determined. IT device information 445 may comprise, but is not limited to, at least two of the following: a universally unique identifier, a virtual machine name, a hypervisor IP address, a group and/or community identifier, a port identifier, a port range identifier, a serial port range, a serial port identifier, a hostname, an IP Address, a protocol type, a service provider type, a MAC Address, a hierarchical organization, a combination thereof, and/or the like. IT device information 445 may comprise: a full, partial, substring or regular expression of the IT device information.

A configuration rule that is compatible with the IT device information may be matched at block 530. The IT device/configuration rule match(es) 455 may be made by, for example, a configuration rule matching module 450. According to some of the various embodiments, some of the configuration rule(s) may employ AND/OR logic to compare at least two of the following rule elements: a discovery order, a discovery method, IT device information 445, an action source, an action, a combination thereof, and/or the like. According to other embodiments, some of the configuration rule(s) may comprise at least two of the following rule elements: a discovery order, a discovery method, IT device information 445, an action source, an action, a combination thereof, and/or the like. The matching may comprise comparing at least one of the following: a discovery order, a discovery method, IT device information 445, an action source, an action, a combination thereof, and/or the like. An action source may define another existing IT device in the device inventory that may be employed as a configuration reference for cloning actions.

A discovery order element may be configured to allow prioritization of a sequence in which configuration rules are evaluated. The discovery order may, according to some embodiments, follow an ascendant numerical order. Configuration rules may be moved up or down on the discovery order.

The device inventory may be configured to hold configuration data for IT device(s) such as one or more of IT devices 411, 412 . . . 419. The device inventory may comprise at least one data store. A data store is a storage mechanism configured to maintain IT device information for available IT devices connected to a network. According to some of the various embodiments, the device inventory may comprise at least two distributed data stores.

At block 540, an action 465 on a device inventory may be performed, determined at least in part, by the configuration rule. The device inventory actions 465 may be performed by, for example, an action module 460. An action is an operation executed based on the evaluation of a rule. Examples of the device inventory actions 465 comprise, but are not limited to: cloning the configuration of another existing IT device in the device inventory and executing an update action, updating the configuration of the at least one IT device if the at least one IT device is already in the device inventory and requires a configuration change, taking no action with regard to the at least one IT device, a combination thereof, and/or the like. According to some of the various embodiments, performing a device inventory action 465 may comprise updating or cloning at least one of the following pieces of configuration parameters from another existing IT device in the device inventory: individual IT device parameters, group IT device parameters, group of users' parameters, IT device classification parameters, IT device access rights parameters, notification parameters, data logging parameters, alert parameters, IT device initial status, a combination thereof, and/or the like.

An IT device initial status may define the status of the IT device upon an action. Examples of an IT device initial status comprise a status such as, but not limited to: on demand, enabled, disabled, discovered, and/or the like. For example, on a cloning action, an IT device initial status may classify the newly added IT device under a 'discovered' or 'disabled' status for further review by the administrator of the Infrastructure Management Device. According to another example, an IT device initial status may classify the newly added IT device under an 'enabled' and/or 'on demand' status permitting interaction with the IT device without further review.

During the process of a clone action and/or update action, the following items may be reconfigured: individual IT device parameters, group IT device parameters, user group parameters, IT device classification parameters, IT device access rights parameters, notification parameters, data logging parameters, alert parameters, IT device initial status (es), a combination thereof, and/or the like. Individual IT device parameters may comprise, but are not limited to: IP address(es), socket port(s), firewall port(s), authentication credential(s), URL(s), mailing address location(s), IT device type(s), communication template(s), data logging, event logging, custom fields, communication parameters, combinations thereof, and/or the like. Group IT device parameters may comprise, but are not limited to, a list of IT devices associated with a group. User group parameters may comprise, but are not limited to: a list of local or remote users associated with a group. IT device classification parameters may comprise, but are not limited to: parameters associated to template and IT device type class(es) employed for inter-device communication. Examples comprise, but are not limited to: cisco_usc, console_server_acs, console_server_acs6000, console_server_opengear, device_console, drac, idrac6, ilo, ilom, ipmi_1.5, ipmi_2.0, netapp, rsaII, virtual_console_kvm, virtual_console_vmware, combinations thereof, and/or the like. IT device access rights parameters may comprise a granular control of an IT device's operation. Examples of IT device access rights parameters comprise, but are not limited to: read and write session, read only session, power status, power control, tunnel, service processor, console, combinations thereof, and/or the like. Notification parameters may comprise configuration information on a notification destination, which communication process to use for a notification, the type of information to send in a notification, combinations thereof, and/or the like. Data logging parameters may comprise configuration information associated with the collection of log(s) from IT device(s) and the storage of data log(s). Alert parameters may comprise information on pattern(s) and logic to inspect the log(s) and generate alert(s).

Some of the various embodiments relate to enabling communication with and between various IT devices, for example, from multiple vendors through standardized interactions. The various IT devices may comprise, but are not limited to: virtual devices operating on configured hardware computing devices and/or physical computing devices. More specifically, some of the various embodiments may provide a vendor-neutral and normalized feature set stack across various IT devices that address feature gaps among devices from multiple vendors operating within an IT system. Some of the various embodiments may provide feature set deviations.

The variety of the IT devices from multiple vendors may operate in an IT system such as, for example, a data center. Significant overhead may be required in order to interact with the diverse set of IT devices that may require use of different network protocols and user interfaces in order to (but not limited to) communicate, manage, configure, control and access these IT devices. To exacerbate this problem, large data centers may have to interact with hundreds of thousands of these IT devices creating a multi-vendor scalability problem to (but not limited to) locate, secure, interact, and track the IT devices.

Some of the various embodiments may enable standardized interaction with heterogeneous IT devices from multiple vendors (e.g. compute nodes, networking nodes, storage nodes, power nodes, cooling nodes, virtual (in combination with hardware) and/or physical IT devices). A normalized vendor-neutral feature set stack and unified common user interaction across different IT devices may be employed to address feature gaps from multi-vendor systems and/or feature set deviations and particularities of multi-vendor systems.

Figure 6:
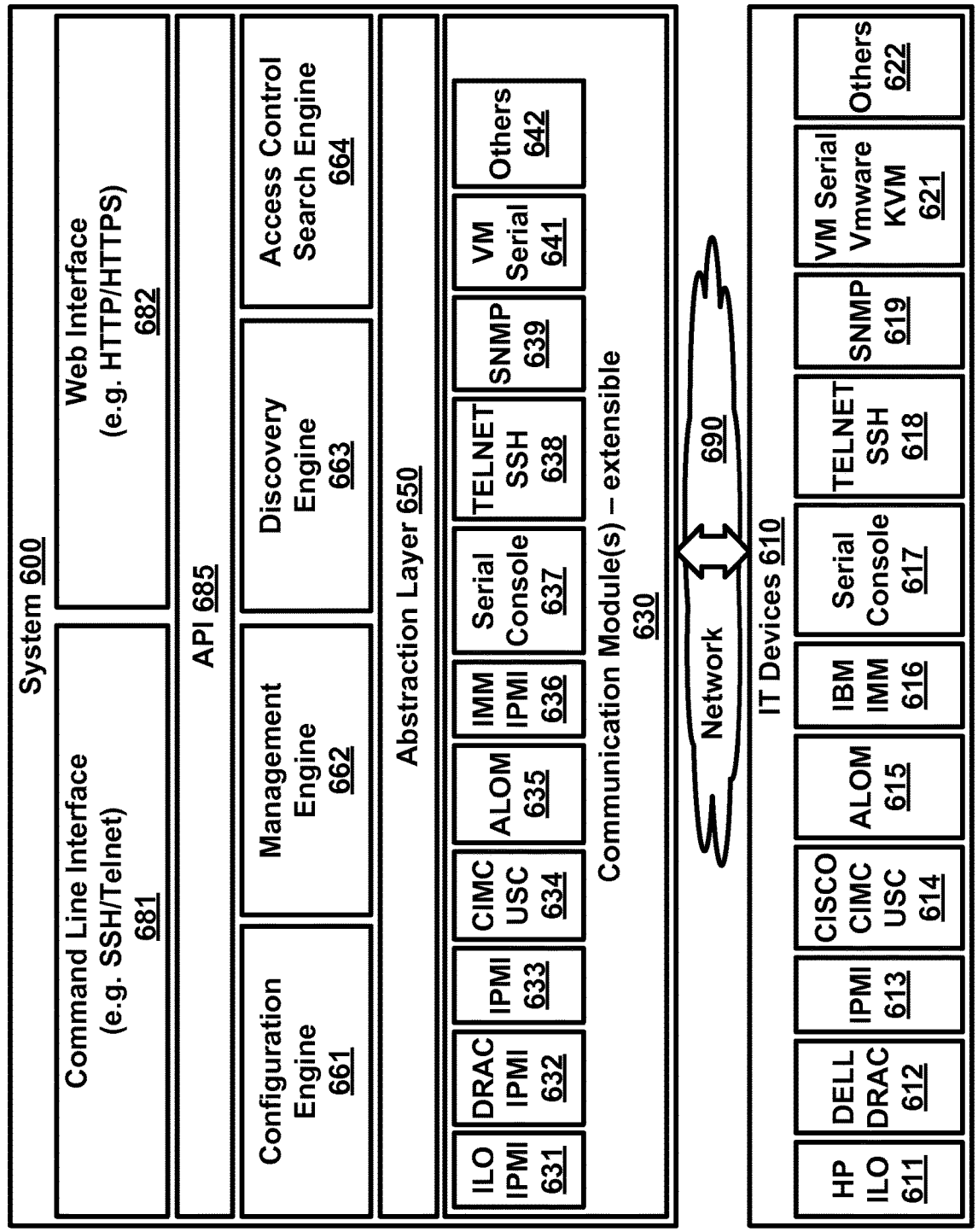
FIG. 6 is a block diagram showing an example architecture comprising components employed to enable standardized interactions with heterogeneous information technology devices from various vendors according to some aspects of various embodiments of the present invention.

FIG. 6 is a block diagram showing an example architecture comprising various components employed to enable standardized interactions with heterogeneous information technology devices from various vendors according to some aspects of various embodiments of the present invention. The vendor-neutral system 600 for enabling standardized interaction with IT devices 610 of various types and from multiple vendors presented in FIG. 6 shows a set of extensible communications modules 630 that may communicate with the IT devices 610 over network 690. These IT devices 610 may comprise physical and/or virtual nodes (e.g. compute nodes, networking nodes, storage nodes, power nodes, cooling nodes, and/or the like) and they may request connection and configuration or be polled via network protocols once they are powered on, or on a periodic basis, according to their protocol specifications. Information in IT device requests may be collected by the Discovery Engine 663 and treated as the Personality Identification(s) of some or all of IT device(s) 610 in order to automatically add those IT device(s) 610 into the system 600. Alternatively, an IT device (e.g. 611 through 622) may also be added via Configuration Engine 661 by providing the IT device Personality Identification associated with an IT device (e.g. 611 through 622) manually via a Command Line interface 681; Web interface 682 or programmatically via an Application Programmable Interface (API). IT devices (e.g. 611 through 622), which may be from single or multiple vendors (possibly with different protocols, user interfaces and features), added to the system 600 may be available for interaction. Access-Control-Search Engine 664 and Management Engine 662 may be configured to be responsible for enabling interaction with the IT devices 610 via Abstraction Layer 650. Abstraction Layer 650 (which may be responsible for the dictionary and translation between the engines and different protocols) may provide a foundation for the normalization of the interaction and allow extensibility via the extensible communication modules 630.

According to FIG. 6, interactions with IT devices 610 may be performed via extensible communication module(s) 630. Extensible communication module(s) 630 may understand the particularities of the IT device type with which it interacts. Examples modules that implement protocols and services comprise, by are not limited to: IPMI 633 for generic vendors, CIMC 634 for Cisco devices, DRAC 632 for Dell devices, ILO 631 for HP devices, IMM 636 for IBM devices, ALOM 635 for Oracle devices, Telnet/SSH 638 for generic devices, serial console port 637, VM serial 641 for VMware devices such as VM/Mouse-Keyboard-Screen (MKS) and Virtual Serial for keyboard-Video-Mouse (KVM) and SNMP 639, others 642 that may be extended, combinations thereof, and/or the like. Information exchanged with IT devices 610 and access/interaction mechanism(s) may vary according to the IT device type. Access/interaction and associated complex information, which may have for example mouse-keyboard-screen data, serial console data, event data, and environment data among others, may be presented in a normalized manner to a user (or device) via Web, Command Line and API interfaces for IT devices handled by the system in order to provide a common user experience irrespective of IT device characteristics. For example (but not limited to), a command like "power off", which may be available on a unified common user interface of the system for a given IT device, may be translated by Abstraction Layer 650 in specific instructions according to the profile of the IT device. A system administrator may not be required to have knowledge of the particular parameters required to execute the action regardless if the action is being carried out on an IPMI server 613, Dell DRAC server 612, ALOM server 615, IBM IMM server 616, Cisco CIMC server 614, HP ILO server 611, SNMP 619, VMware VM and/or KVM VM 621 or other IT device 622 controlled by the system, including devices communicating over serial console port 617, a Telnet and/or SSH port 618, a combination thereof, and/or the like.

Figure 7:
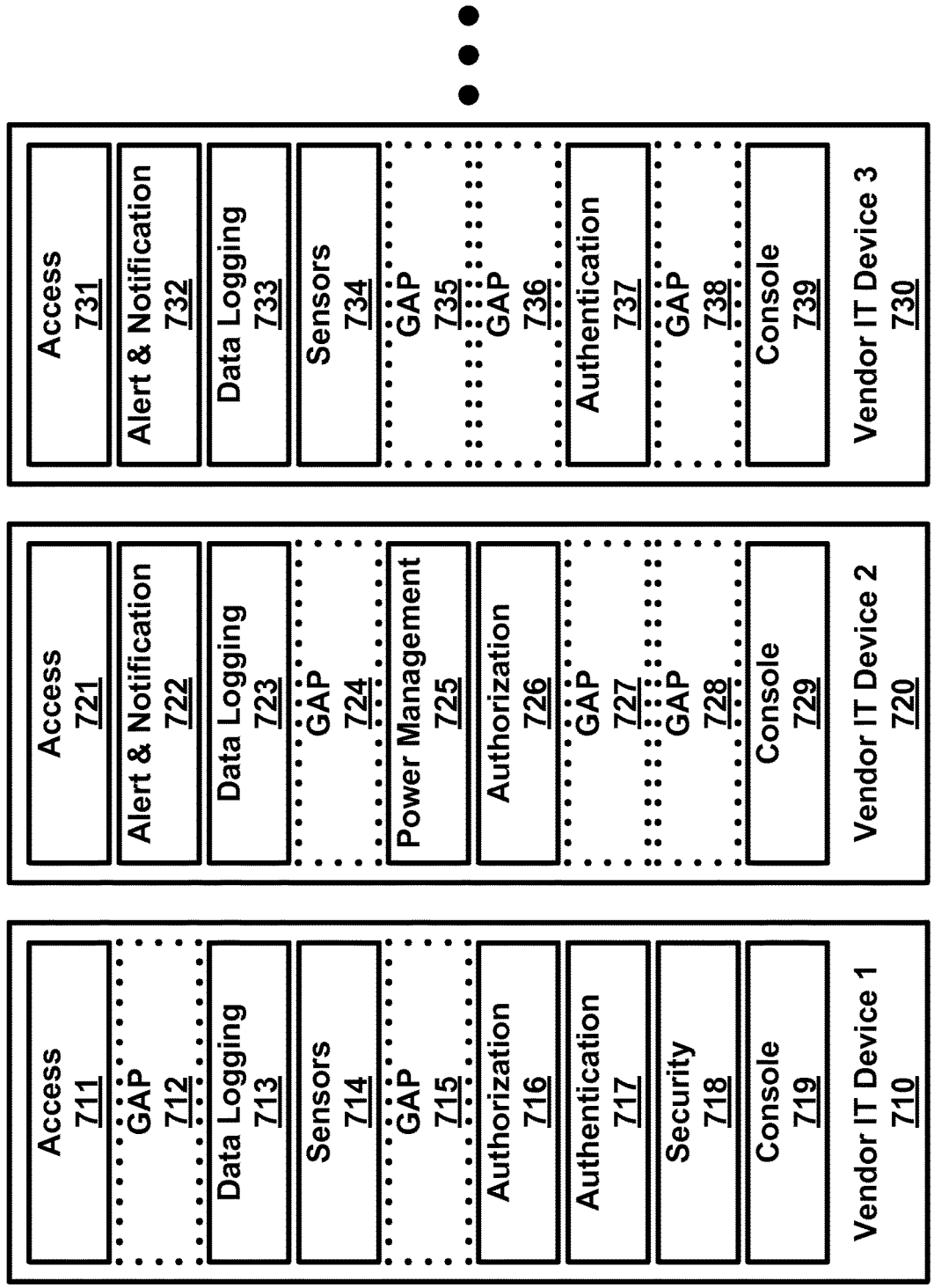
FIG. 7 is a block diagram illustrating gaps in the feature sets of example individual vendor's IT devices according to some aspects of various embodiments of the present invention.
Figure 8:
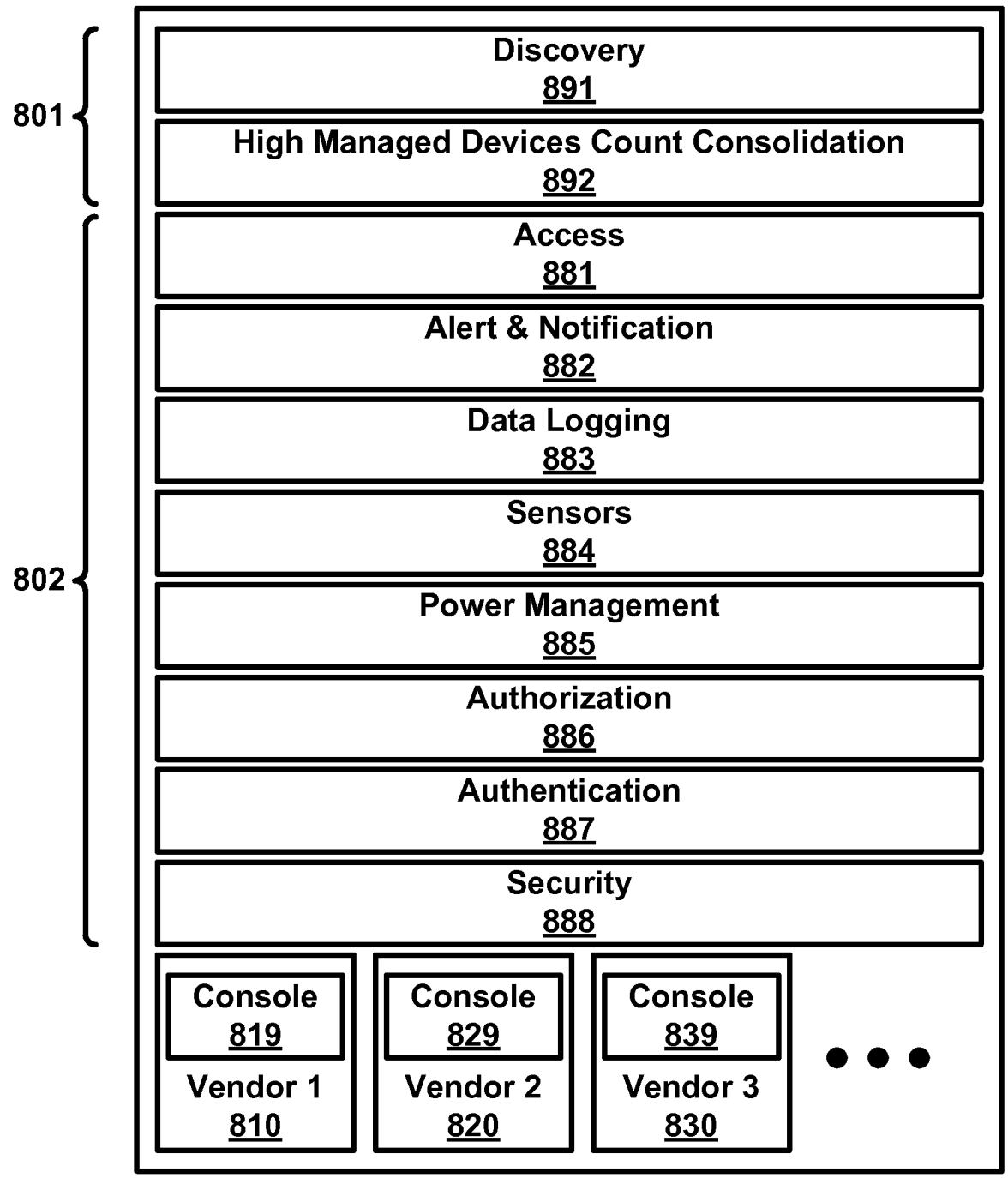
FIG. 8 is a block diagram illustrating an example vendor-neutral feature set according to some aspects of various embodiments of the present invention.

FIG. 7 is a block diagram illustrating gaps in the feature sets of example individual vendors' stacks according to some aspects of various embodiments of the present invention. FIG. 8 is a block diagram illustrating an example vendor-neutral feature set according to some aspects of various embodiments of the present invention.

FIG. 7 illustrates example feature set stacks (vertical and horizontal alignments) natively running on IT devices (710, 720, and 730) and examples of possible feature gaps (712, 715, 724, 727, 728, 735, 736 and 738) across solutions from the different example IT devices by different vendors (710, 720, and 730). Even if all vendors provide a particular feature (for example 'Access' 711), the implementation of the specific feature may vary between vendors. This may require adjustments by a user to accommodate discrepancies of any given feature. Another example may be seen where 'Power Management' feature 725 is only available with one IT device/vendor 720. As illustrated, the same feature is not available across other vendors. For example, there is a 'Power Management' feature gap 715 for IT device/vendor 710 and a Power Management' feature gap 735 for IT device/vendor 730. Also shown in example FIG. 7 are illustrations of: access features 711, 721 and 731; alert and notification features 722 and 723 with alert and notification feature gap 712; data logging features 713, 723 and 733; Sensors features 714 and 734 with sensor feature gap 724; authorization features 716 and 726 with authorization feature gap 736; authentication features 717 and 737 with authentication feature gap 727; security feature 718 and security feature gaps 728 and 738; and console features 719, 729 and 739.

Rather than having an incomplete native vertical feature set stack from the IT device itself or having variations and discrepancies among horizontal features across IT devices from different vendors, some of the various embodiments may leverage the ability to redefine those features via software (in combination with hardware) in a homogenous manner to present a common and enhanced feature stack to IT devices as shown in FIG. 8, item group 802 (e.g. access 881, alert and notification 882, data logging 883, sensors 884, power management 885, authorization 886, authentication 887, and security 888). Additionally, according to some of the various embodiments, the feature stack may be increased as shown in item group 801 (e.g. high managed devices count consolidation 892 and discovery 891) by adding new functionality that may be automatically extended to some or all of the devices in a system. This may allow feature gaps to be bridged among IT devices and extend their functionality. Moreover, even an IT device with very limited native features may be employed as part of an integrated solution, since the vendor-neutral system may provide a common feature stack, extending and normalizing features across vendors 810, 820 and 830 (having consoles 819, 829 and 839 respectively). Furthermore, the vendor-neutral system may allow the same user experience and capabilities across classes of IT devices either via manual interaction or in a programmatic way. The scalability of the system 600 may be a simpler problem to solve (by for example modifying CPU and memory configurations of the environment where the system runs) than a physical IT device hardware constraint (by adding more physical IT devices). The system 600 solution may also enable a higher concentration of managed IT device nodes.

As shown in FIGS. 7 and 8, the adoption of multiple IT device vendors may require an understanding of different feature set stacks that may not align horizontally and/or vertically across vendors or may provide different mechanisms to interact with the IT device, creating a gap in functionality and an unnecessarily complex user experience. Some techniques for working around these problems may require 1) adopting a single vendor source strategy as much as possible; 2) handling multiple user interfaces and configuration tools from each IT vendor and 3) coping with feature gaps and feature limitations. Addressing this diversity without 1) limiting vendor choices; 2) requiring adoption of multiple tools with different user interfaces; and 3) lacking of a common functionality, may allow system administrators to maintain control of the IT devices without having to spend unnecessary time and resources. However, the challenge up to the present time has been to recognize that this diversity of IT devices may be a problem since the status quo allows vendors' dominance on their market segment. Invariably, system administrators may have to deal with many user interfaces in order to interact with the IT devices or create stop gap measures to deal with the diversity of their heterogeneous IT environments.

The nature of the interaction between system administrators and the IT devices may be defined by the type of device itself and the network protocols supported by the device. The type of IT devices may also be used to identify the class of tailored interfaces and communication modules that apply to the IT devices. Some of the various communication modules may be plug-in communication modules. With reference to FIGS. 7 and 8, IT devices by various vendors 710, 711 and 712 may have a different vertical feature set implementation (e.g. a virtual machine will have connection requirements that are different from a physical serial port concentrator or rack servers with service processor(s)). Some vendors may provide IT devices with different functionalities within the same market space (e.g. serial port concentrator vendors like Avocent, Digi, Raritan and OpenGear may have common functionalities and differentiators among them or service processor vendors such as Dell, HP and Cisco may have basic common functionalities and distinct features). The combination of diverse user interfaces, network protocols, and feature set deviations and gaps may be difficult to manage. Some of the various embodiments may build a set of tailored libraries that covers vendors' feature commonalities and discrepancies. The specific interaction requirements of each IT vendor may be consolidated in a tailored set of libraries. The vendor-neutral systems' feature stack may combine the functionality of each individual vendor resulting in a much richer stack of features. The collection of tailored libraries along with a common interface and full feature stack may be employed to create a normalized interaction experience across multiple vendors eliminating the need for individual solutions and multiple interfaces and reducing dependency on any given vendors. Some of the various embodiments may provide a normalized user experience, a more complete feature set and a reduction in time and resources used, while allowing the system administrator flexibility when deciding on a vendor solution or planning expansion/replacement on their data centers.

Figure 9:
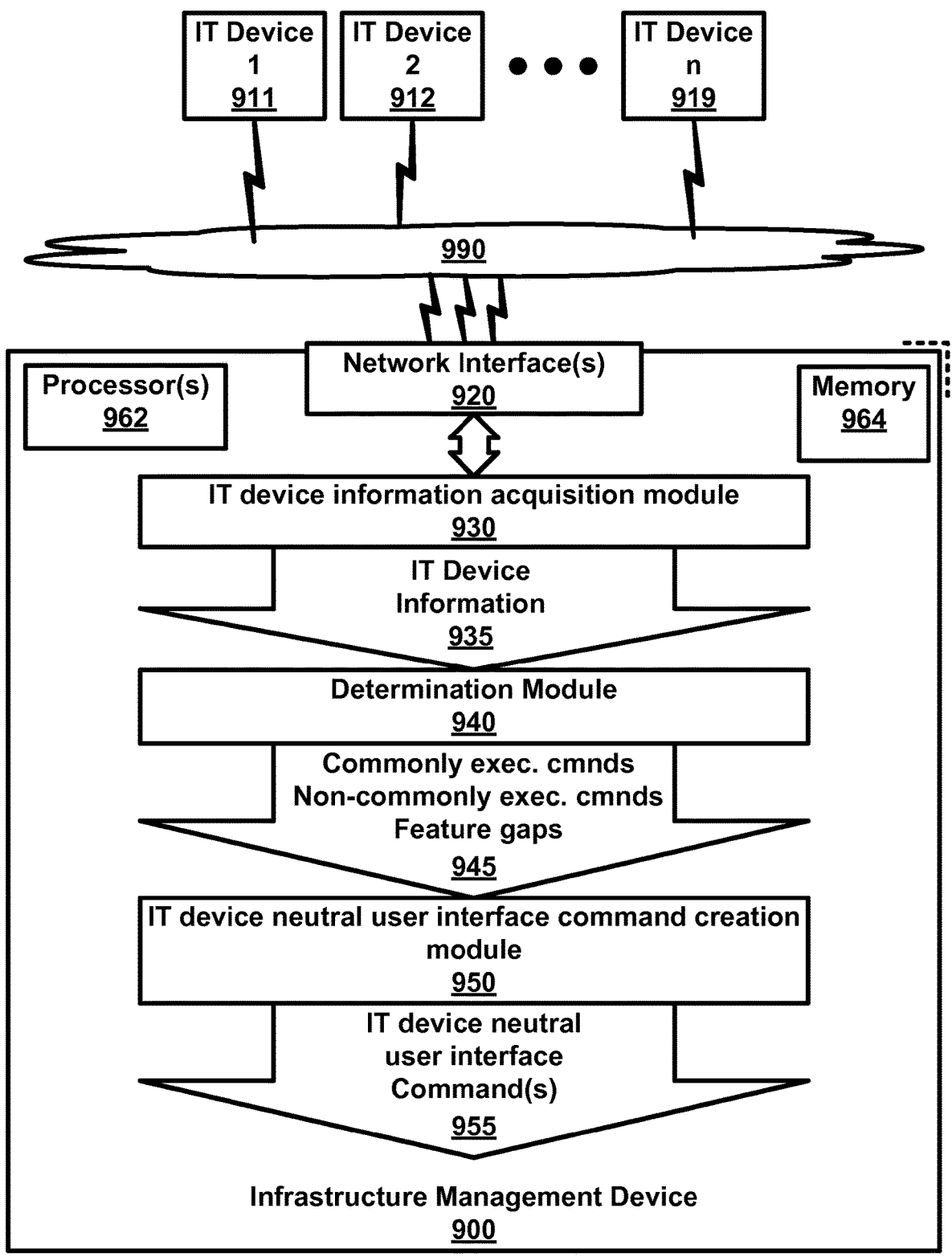
FIG. 9 is an example block diagram of an infrastructure management device according to some aspects of various embodiments of the present invention.
Figure 10:
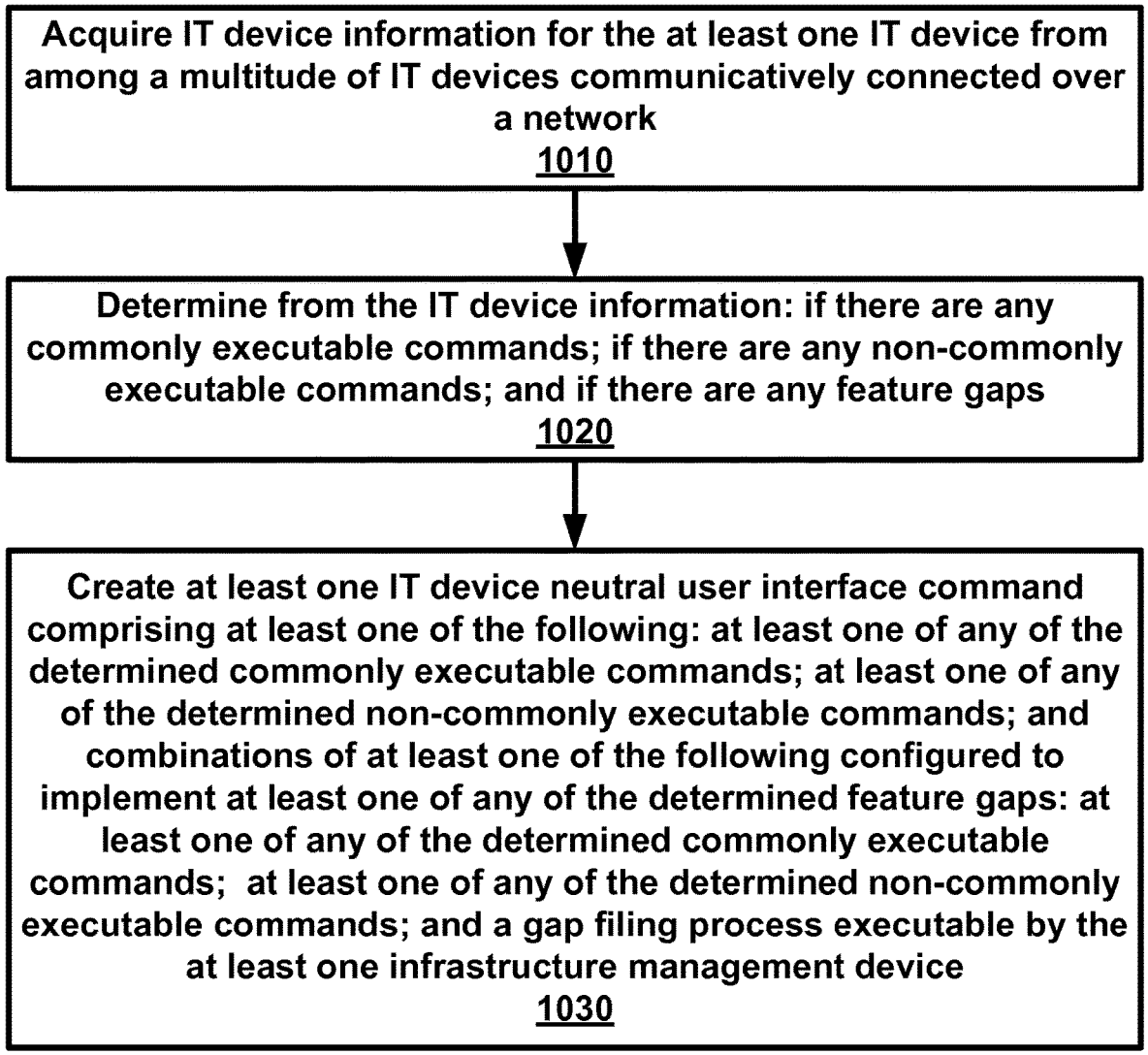
FIG. 10 is an example flow diagram of device neutral user interface command creation according to some aspects of various embodiments of the present invention.

FIG. 9 is an example block diagram of an infrastructure management device 900 according to some aspects of various embodiments of the present invention. FIG. 10 is an example flow diagram of device neutral user interface command creation according to some aspects of various embodiments of the present invention.

Some of the various embodiments may comprise an infrastructure management device 900. The infrastructure management device 900 may comprise at least one processor 962, memory 964, network interface(s) 920 and other supporting hardware (e.g. electronic communications busses, controllers, non-transitory tangible machine readable medium readers, and/or the like). The memory 964 may comprise a non-transitory tangible machine readable medium. The non-transitory tangible machine readable medium may comprise instructions configured to cause at least one processor 962 to create device neutral user interface commands 955. The network interface(s) 920 may be configured to communicate with a multitude of IT devices (911, 912 . . . 919) over a network 990. Network 990 may comprise, but is not limited to: the Internet, an intranet, a connection to the Internet, a private cloud, interconnected data centers, a multi-nodal network, two or more computing devices connected using a Virtual Private Network, an on-premise network, a combination thereof, and/or the like. A multi-nodal network may comprise, but is not limited to a network comprising at least two network nodes that may connect to, or be incorporated in one of the following: an intranet, a private cloud, interconnected data centers, two or more computing devices connected using a Virtual Private Network, an on-premise network, a combination thereof, and/or the like.

Infrastructure management device 900 may comprise a multitude of infrastructure management devices 900 configured to cooperatively operate together. Examples of infrastructure management device(s) 900 may comprise, but are not limited to: a server, a compute node, a router, a switch, a firewall, a load balancer, a networking node, a storage node, a power node, a cooling node, a network appliance, a virtual appliance, system hardware with network access, a hosted module within a system, and/or the like. According to some of the various embodiments, infrastructure management device(s) may comprise a virtual machine running on a hardware computing device and acting as at least one of the following: a server, a compute node, a router, a switch, a firewall, a load balancer, a networking node, a storage node, a power node, a cooling node, a network appliance, a virtual appliance, system hardware with network access, a hosted module within a system, and/or the like.

According to some of the various embodiments, IT device(s) (911, 912 . . . 919) may comprise at least one of the following: a server, a compute node, a router, a switch, a firewall, a load balancer, a networking node, a storage node, a power node, a cooling node, a network appliance, a virtual appliance, system hardware with network access, a hosted module within a system, a combination thereof, and/or the like.

IT device information 935 may be acquired for at least one IT device from among a multitude of IT devices (911, 912 . . . 919) communicatively connected over network 990 at block 1010. This IT device information 935 may be determined by, for example, IT device information acquisition module 930. IT device information 935 may comprise a set of data associated to an IT device that enables characteristics of the IT device which are useful for IT device classification and interaction to be determined. IT device information 935 may comprise, but is not limited to, at least two of the following: a universally unique identifier, a virtual machine name, a hypervisor IP address, a group and/or community identifier, a port identifier, a port range identifier, a serial port range, a serial port identifier, a hostname, an internet protocol Address, a protocol type, a service provider type, a MAC address, a hierarchical organization, a combination thereof, and/or the like. IT device information 935 may comprise: a full, partial, substring or regular expression of the IT device information. The IT device information may, according to some of the various embodiments, comprise information regarding an interface module employed by IT device(s). Example interfaces may employ, but are not limited to: socket, web services (e.g. soap, wsdl), snmp, specific or proprietary IP device protocols, combinations thereof, and/or the like.

Commonly executable commands, non-commonly executable commands, and feature gaps (945) may be determined from the IT device information 935 at block 1020. These commands and feature gaps 945 may be determined by, for example, determination module 940.

Commonly executable commands may comprise, but are not limited to: a local authentication command, a remote authentication command, a fan adjustment command, a read sensor command, a power management command, an authorization command, a data logging command, an alert command, a notification command, an access command, a remote access command, a reboot command, a suspend command, a shut-down command, a power-on command, a power-off command, a power command, a console access command, a remote console access command, a KVM command, an MKS command, a remote shell command, a local command, a remote command, an information command, a configuration command, a tunnel command, a browser command, a search command, a service processor command, a service processor event log command, a service processor hardware associated command, a service processor sensor command, a custom command, combinations thereof, and/or the like. Commonly executable commands may be protocol dependent. Similarly, commonly executable commands may be parameter dependent.

The non-commonly executable commands may comprise at least one of the following: a local authentication command, a remote authentication command, a fan adjustment command, a sensor command, a power management command, an authorization command, a data logging command, an alert command, a notification command, an access command, a remote access command, a reboot command, a suspend command, a shut-down command, a power-on command, a power-off command, a power command, a console access command, a remote console access command, a KVM command, an MKS command, a remote shell command, a local command, a remote command, an information command, a configuration command, a tunnel command, a browser command, a search command, a service processor command, a service processor event log command, a service processor hardware associated command, a service processor sensor command, a custom command, combinations thereof, and/or the like. Similarly, non-commonly executable commands may be parameter dependent.

According to some of the various embodiments, determined feature gaps may comprise, but are not limited to: a local authentication command, a remote authentication command, a fan adjustment command, a sensor command, a power management command, an authorization command, a data logging command, an alert command, a notification command, an access command, a remote access command, a reboot command, a suspend command, a shut-down command, a power-on command, a power-off command, a power command, a console access command, a remote console access command, a KVM command, an MKS command, a remote shell command, a local command, a remote command, an information command, a configuration command, a tunnel command, a browser command, a search command, a service processor command, a service processor event log command, a service processor hardware associated command, a service processor sensor command, a custom command, combinations thereof, and/or the like. Determined feature gaps may be protocol and/or parameter dependent.

IT device neutral user interface command(s) 955 may be created at block 1030. These IT device neutral user interface command(s) 955 may be created by, for example, IT device neutral user interface command creation module 950. According to some of the various embodiments, some of the IT device neutral user interface command(s) 955 may comprise, but are not limited to: (1) at least one of any of the determined commonly executable commands, and (2) at least one of any of the determined non-commonly executable commands. According to some of the various embodiments, some of the IT device neutral user interface command(s) 955 may comprise, but are not limited to combinations of at least one of the following configured to implement at least one of any of the determined feature gaps: (1) at least one of any of the determined commonly executable commands, (2) at least one of any of the determined non-commonly executable commands, and (3) a gap filling process executable by the at least one infrastructure management device.

IT device neutral user interface command(s) 955 may comprise at least one of the following: a command-line command, a browser command, an interpreted command, an API command, a console command, a graphical user interface (GUI) command, a macro command, a Web services command, a SNMP command, an IPMI command, a combination thereof, and/or the like.

IT device neutral user interface command(s) 955 may be configured to extend the functionality of at least one of the IT device(s) 911, 912 . . . 919. For example, IT device neutral user interface command(s) 955 may extend functionality for (but not limited to): data logging, alert, or notification to IT device(s) that may not have such autonomous features, may have limited features or may have a non-standard implementation of these examples of features. Similarly, some of the IT device neutral user interface command(s) 955 may be configured to extend the functionality of a group of the IT devices 911, 912 . . . 919. For example, IT device neutral user interface command(s) 955 may extend functionality for (but not limited to): remote authentication or authorization to a group of the IT device(s) that may not have such autonomous features, may have limited features or may have a non-standard implementation of these examples of features, which may allow the group of the IT devices(s) to behave similarly.

IT device neutral user interface command(s) 955 may be configured to extend the functionality of at least one command for IT device(s) 911, 912 . . . 919. For example, IT device neutral user interface command(s) 955 may extend a graceful shutdown power command (but not limited to) to IT device(s) like HP, Dell, IBM and others that may not have such an autonomous command, may have a limited command or may have a non-standard graceful shutdown power command. Similarly, some of the IT device neutral user interface command(s) 955 may be configured to extend the functionality of command(s) for a group of the IT devices 911, 912 . . . 919. For example, IT device neutral user interface command(s) 955 may extend a remote console access command (but not limited to) to a group of physical servers like HP, Dell, IBM; to a group of virtual appliances or virtual machines; or to a group of network IT devices like routers and switches that may not have such an autonomous command, may have limited command or may have a non-standard remote console access command. Additionally, IT device neutral user interface command(s) 955 may comprise a temporal sequence of at least two IT device commands 955. For example, IT device neutral user interface command(s) 955 may extend a power reboot command (but not limited to) to a group of IT devices that may not have autonomously such a command, may have limited command or may have a non-standard reboot command by executing for example two consecutive commands like (but not limited to) a power off command followed by a power on command.

The actions of blocks 1010, 1020, and 1030 may be executed multiple times.

Figure 11:
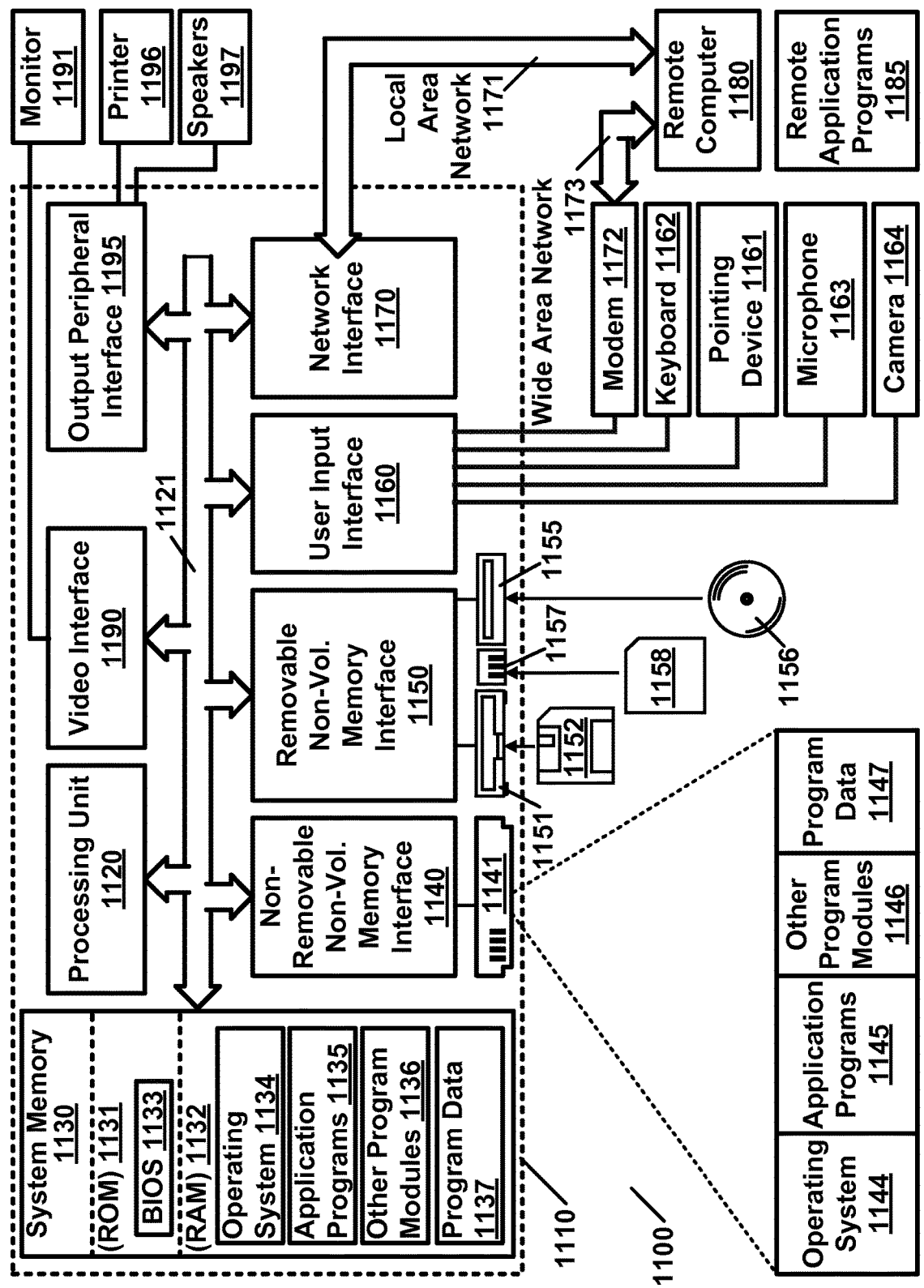
FIG. 11 illustrates an example of a suitable computing system environment on which aspects of some embodiments may be implemented.

FIG. 11 illustrates an example of a suitable computing system environment 1100 on which aspects of some embodiments may be implemented. The computing system environment 1100 is only one example of a suitable computing environment and is not intended to suggest any limitation as to the scope of use or functionality of the claimed subject matter. Neither should the computing environment 1100 be interpreted as having any dependency or requirement relating to any one or combination of components illustrated in the exemplary operating environment 1100.

Embodiments are operational with numerous other general purpose or special purpose computing system environments or configurations. Examples of well-known computing systems, environments, and/or configurations that may be suitable for use with various embodiments include, but are not limited to, embedded computing systems, personal computers, server computers, hand-held or laptop devices, multiprocessor systems, microprocessor-based systems, set top boxes, programmable consumer electronics, network PCs, minicomputers, mainframe computers, cloud services, telephony systems, distributed computing environments that include any of the above systems or devices, and the like.

Embodiments may be described in the general context of computer-executable instructions, such as program modules, being executed by a computer. Generally, program modules include routines, programs, objects, components, data structures, etc. that perform particular tasks or implement particular abstract data types. Some embodiments are designed to be practiced in distributed computing environments where tasks are performed by remote processing devices that are linked through a communications network. In a distributed computing environment, program modules are located in both local and remote computer storage media including memory storage devices.

With reference to FIG. 11, an example system for implementing some embodiments includes a general-purpose computing device in the form of a computer 1110. Components of computer 1110 may include, but are not limited to, a processing unit 1120, a system memory 1130, and a system bus 1121 that couples various system components including the system memory to the processing unit 1120.

Computer 1110 typically includes a variety of computer readable media. Computer readable media can be any available media that can be accessed by computer 1110 and includes both volatile and nonvolatile media, and removable and non-removable media. By way of example, and not limitation, computer readable media may comprise computer storage media and communication media. Computer storage media includes both volatile and nonvolatile, and removable and non-removable media implemented in any method or technology for storage of information such as computer readable instructions, data structures, program modules or other data. Computer storage media includes, but is not limited to, random access memory (RAM), read-only memory (ROM), electrically erasable programmable read-only memory (EEPROM), flash memory or other memory technology, compact disc read-only memory (CD-ROM), digital versatile disks (DVD) or other optical disk storage, magnetic cassettes, magnetic tape, magnetic disk storage or other magnetic storage devices, or any other medium which can be used to store the desired information and which can be accessed by computer 1110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media. Combinations of any of the above should also be included within the scope of computer readable media.

The system memory 1130 includes computer storage media in the form of volatile and/or nonvolatile memory such as ROM 1131 and RAM 1132. A basic input/output system 1133 (BIOS), containing the basic routines that help to transfer information between elements within computer 1110, such as during start-up, is typically stored in ROM 1131. RAM 1132 typically contains data and/or program modules that are immediately accessible to and/or presently being operated on by processing unit 1120. By way of example, and not limitation, FIG. 11 illustrates operating system 1134, application programs 1135, other program modules 1136, and program data 1137.

The computer 1110 may also include other removable/non-removable volatile/nonvolatile computer storage media. By way of example only, FIG. 11 illustrates a hard disk drive 1141 that reads from or writes to non-removable, nonvolatile magnetic media, a magnetic disk drive 1151 that reads from or writes to a removable, nonvolatile magnetic disk 1152, a flash drive reader 1157 that reads flash drive 1158, and an optical disk drive 1155 that reads from or writes to a removable, nonvolatile optical disk 1156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 1141 is typically connected to the system bus 1121 through a non-removable memory interface such as interface 1140, and magnetic disk drive 1151 and optical disk drive 1155 are typically connected to the system bus 1121 by a removable memory interface, such as interface 1150.

The drives and their associated computer storage media discussed above and illustrated in FIG. 11 provide storage of computer readable instructions, data structures, program modules and other data for the computer 1110. In FIG. 11, for example, hard disk drive 1141 is illustrated as storing operating system 1144, application programs 1145, program data 1147, and other program modules 1146. Additionally, for example, non-volatile memory may include instructions to, for example, discover and configure IT device(s); the creation of device neutral user interface command(s); combinations thereof, and/or the like.

A user may enter commands and information into the computer 1110 through input devices such as a keyboard 1162, a microphone 1163, a camera 1164, and a pointing device 1161, such as a mouse, trackball or touch pad. These and other input devices are often connected to the processing unit 1120 through a user input interface 1160 that is coupled to the system bus, but may be connected by other interface and bus structures, such as a parallel port, game port or a universal serial bus (USB). A monitor 1191 or other type of display device may also connected to the system bus 1121 via an interface, such as a video interface 1190. Other devices, such as, for example, speakers 1197 and printer 1196 may be connected to the system via peripheral interface 1195.

The computer 1110 is operated in a networked environment using logical connections to one or more remote computers, such as a remote computer 1180. The remote computer 1180 may be a personal computer, a hand-held device, a server, a router, a network PC, a peer device or other common network node, and typically includes many or all of the elements described above relative to the computer 1110. The logical connections depicted in FIG. 11 include a local area network (LAN) 1171 and a wide area network (WAN) 1173, but may also include other networks. Such networking environments are commonplace in offices, enterprise-wide computer networks, intranets and the Internet.

When used in a LAN networking environment, the computer 1110 is connected to the LAN 1171 through a network interface or adapter 1170. When used in a WAN networking environment, the computer 1110 typically includes a modem 1172 or other means for establishing communications over the WAN 1173, such as the Internet. The modem 1172, which may be internal or external, may be connected to the system bus 1121 via the user input interface 1160, or other appropriate mechanism. The modem 1172 may be wired or wireless. Examples of wireless devices may comprise, but are limited to: Wi-Fi and Bluetooth. In a networked environment, program modules depicted relative to the computer 1110, or portions thereof, may be stored in the remote memory storage device. By way of example, and not limitation, FIG. 11 illustrates remote application programs 1185 as residing on remote computer 1180. It will be appreciated that the network connections shown are exemplary and other means of establishing a communications link between the computers may be used. Additionally, for example, LAN 1171 and WAN 1173 may provide a network interface to communicate with other distributed infrastructure management device(s); with IT device(s); with users remotely accessing the User Input Interface 1160; combinations thereof, and/or the like.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

In this specification, "a" and "an" and similar phrases are to be interpreted as "at least one" and "one or more."

References to "an" embodiment in this disclosure are not necessarily to the same embodiment.

Many of the elements described in the disclosed embodiments may be implemented as modules. A module is defined here as an isolatable element that performs a defined function and has a defined interface to other elements. The modules described in this disclosure may be implemented in hardware, a combination of hardware and software, firmware, wetware (i.e. hardware with a biological element) or a combination thereof, all of which are behaviorally equivalent. For example, modules may be implemented using computer hardware in combination with software routine(s) written in a computer language (Java, HTML, XML, PHP, Python, ActionScript, JavaScript, Ruby, Prolog, SQL, VBScript, Visual Basic, Perl, C, C++, Objective-C or the like). Additionally, it may be possible to implement modules using physical hardware that incorporates discrete or programmable analog, digital and/or quantum hardware. Examples of programmable hardware include: computers, microcontrollers, microprocessors, application-specific integrated circuits (ASICs), field programmable gate arrays (FPGAs), and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above mentioned technologies may be used in combination to achieve the result of a functional module.

Some embodiments may employ processing hardware. Processing hardware may include one or more processors, computer equipment, embedded systems, machines a combination thereof, and/or the like. The processing hardware may be configured to execute instructions. The instructions may be stored on a machine-readable medium. According to some embodiments, the machine-readable medium (e.g. automated data medium) may be a medium configured to store data in a machine-readable format that may be accessed by an automated sensing device. Examples of machine-readable media include: magnetic disks, cards, tapes, and drums, flash memory, memory cards, electrically erasable programmable read-only memory (EEPROM), solid state drives, optical disks, barcodes, magnetic ink characters, a combination thereof, and/or the like.

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above described exemplary embodiments. In particular, it should be noted that, for example purposes, the presently described embodiments are discussed with respect to a data center. However, one skilled in the art will recognize that embodiments may be employed to other collections of IT devices over, for example, a distributed network not confined by a single data center, a small collection of IT devices in an Intranet, combinations thereof, and/or the like.

In addition, it should be understood that any figures that highlight any functionality and/or advantages, are presented for example purposes only. The disclosed architecture is sufficiently flexible and configurable, such that it may be utilized in ways other than that shown. For example, the steps listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112. Claims that do not expressly include the phrase "means for" or "step for" are not to be interpreted under 35 U.S.C. 112.

What is claimed is:

1. A non-transitory tangible machine readable medium comprising instructions configured to cause at least one processor on at least one infrastructure management device to perform a process comprising:
    a) acquiring, by the infrastructure management device, IT device information for the at least one IT device from among a multitude of existing IT devices communicatively connected over a network;
    b) determining, by the infrastructure management device, from the IT device information and additional IT device information from a device inventory stored in a Non-Volatile Memory of the infrastructure management device:
        i) if there are any commonly executable commands;
        ii) if there are any non-commonly executable commands; and
        iii) if there are any feature gaps; and
    c) creating, by the infrastructure management device, at least one IT device neutral user interface command comprising:
        i) at least one of any of the determined commonly executable commands;
        ii) at least one of any of the determined non-commonly executable commands; and
        iii) combinations of at least one of the following configured to implement at least one of any of the determined feature gaps:
            (1) at least one of any of the determined commonly executable commands;
            (2) at least one of any of the determined non-commonly executable commands; and
            (3) a gap filling process executable by the at least one infrastructure management device.

2. The non-transitory tangible machine readable medium of claim 1 wherein the commonly executable commands comprise:
    a local authentication command, a remote authentication command, a fan adjustment command, a read sensor command, a power management command, an authorization command, a data logging command, an alert command, a notification command, an access command, a remote access command, a reboot command, a suspend command, a shut-down command, a power-on command, a power-off command, a power command, a console access command, a remote console access command, a Keyboard-Video-Mouse (KVM) command, an Mouse-Keyboard-Screen (MKS) command, a remote shell command, a local command, a remote command, an information command, a configuration command, a tunnel command, a browser command, a search command, a service processor command, a service processor event log command, a service processor hardware associated command, a service processor sensor command, a custom command, or a combination thereof.

3. The non-transitory tangible machine readable medium of claim 1 wherein at least one of the commonly executable commands is protocol dependent.

4. The non-transitory tangible machine readable medium of claim 1 wherein at least one of the commonly executable commands is parameter dependent.

5. The non-transitory tangible machine readable medium of claim 1 wherein the non-commonly executable commands comprise:
a local authentication command, a remote authentication command, a fan adjustment command, a sensor command, a power management command, an authorization command, a data logging command, an alert command, a notification command, an access command, a remote access command, a reboot command, a suspend command, a shut-down command, a power-on command, a power-off command, a power command, a console access command, a remote console access command, a KVM command, an MKS command, a remote shell command, a local command, a remote command, an information command, a configuration command, a tunnel command, a browser command, a search command, a service processor command, a service processor event log command, a service processor hardware associated command, a service processor sensor command, a custom command, or a combination thereof.

6. The non-transitory tangible machine readable medium of claim 1 wherein at least one of the non-commonly executable commands is parameter dependent.

7. The non-transitory tangible machine readable medium of claim 1 wherein the determined feature gaps comprise:
a local authentication command, a remote authentication command, a fan adjustment command, a sensor command, a power management command, an authorization command, a data logging command, an alert command, a notification command, an access command, a remote access command, a reboot command, a suspend command, a shut-down command, a power-on command, a power-off command, a power command, a console access command, a remote console access command, a KVM command, an MKS command, a remote shell command, a local command, a remote command, an information command, a configuration command, a tunnel command, a browser command, a search command, a service processor command, a service processor event log command, a service processor hardware associated command, a service processor sensor command, a custom command, or a combination thereof.

8. The non-transitory tangible machine readable medium of claim 1 wherein at least one of the determined feature gaps is protocol dependent.

9. The non-transitory tangible machine readable medium of claim 1 wherein at least one of the determined feature gaps is parameter dependent.

10. The non-transitory tangible machine readable medium of claim 1 wherein the at least one IT device neutral user interface command comprises:
a command-line command, a browser command, an interpreted command, an application-programming interface (API) command, a console command, a graphical user interface (GUI) command, a macro command, a Web services command, a Simple Network Management Protocol (SNMP) command, an Intelligent Platform Management Interface (IPMI) command, or a combination thereof.

11. The non-transitory tangible machine readable medium of claim 1 wherein the at least one IT device neutral user interface command is configured to extend functionality of one or more IT devices of the multitude of existing IT devices.

12. The non-transitory tangible machine readable medium of claim 1 wherein the at least one IT device neutral user interface command is configured to extend functionality of at least one command for one or more IT devices of the multitude of existing IT devices.

13. The non-transitory tangible machine readable medium of claim 1 wherein the infrastructure management device comprises at least one of the following:
 a) a server;
 b) a compute node;
 c) a router;
 d) a switch;
 e) a firewall;
 f) a load balancer;
 g) a networking node;
 h) a storage node;
 i) a power node;
 j) a cooling node;
 k) a network appliance;
 l) a virtual appliance;
 m) a system hardware with network access; and
 n) a hosted module within a system.

14. The non-transitory tangible machine readable medium of claim 1 wherein the infrastructure management device comprises a virtual machine, running on a hardware computing device and acting as at least one of the following:
 a) a server;
 b) a compute node;
 c) a router;
 d) a switch;
 e) a firewall;
 f) a load balancer;
 g) a networking node;
 h) a storage node;
 i) a power node;
 j) a cooling node;
 k) a network appliance;
 l) a virtual appliance;
 m) a system hardware with network access; and
 n) a hosted module within a system.

15. An infrastructure management device comprising:
at least one network interface configured to communicate with a multitude of IT devices over a network;
at least one processor;
non-transitory tangible machine readable medium including instructions configured to cause the at least one processor to perform a process comprising:
 a) acquiring IT device information for the at least one IT device from among the multitude of IT devices;
 b) determining from the IT device information and additional IT device information from a device inventory:
  i) if there are any commonly executable commands;
  ii) if there are any non-commonly executable commands; and
  iii) if there are any feature gaps; and c) creating at least one IT device neutral user interface command comprising:
  i) at least one of any of the determined commonly executable commands;
  ii) at least one of any of the determined non-commonly executable commands; and
  iii) combinations of at least one of the following configured to implement at least one of any of the determined feature gaps:
    (1) at least one of any of the determined commonly executable commands;
    (2) at least one of any of the determined non-commonly executable commands; and
    (3) a gap filling process executable by the at least one infrastructure management device.

16. The infrastructure management device of claim 15 wherein the commonly executable commands comprise:
a local authentication command, a remote authentication command, a fan adjustment command, a read sensor command, a power management command, an authorization command, a data logging command, an alert command, a notification command, an access command, a remote access command, a reboot command, a suspend command, a shut-down command, a power-on command, a power-off command, a power command, a console access command, a remote console access command, a Keyboard-Video-Mouse (KVM) command, an Mouse-Keyboard-Screen (MKS) command, a remote shell command, a local command, a remote command, an information command, a configuration command, a tunnel command, a browser command, a search command, a service processor command, a service processor event log command, a service processor hardware associated command, a service processor sensor command, a custom command, or a combination thereof.

17. The infrastructure management device of claim 15 wherein the determined feature gaps comprise:
a local authentication command, a remote authentication command, a fan adjustment command, a sensor command, a power management command, an authorization command, a data logging command, an alert command, a notification command, an access command, a remote access command, a reboot command, a suspend command, a shut-down command, a power-on command, a power-off command, a power command, a console access command, a remote console access command, a KVM command, an MKS command, a remote shell command, a local command, a remote command, an information command, a configuration command, a tunnel command, a browser command, a search command, a service processor command, a service processor event log command, a service processor hardware associated command, a service processor sensor command, a custom command, or a combination thereof.

18. The infrastructure management device of claim 15 wherein the at least one IT device neutral user interface command comprises:
a command-line command, a browser command, an interpreted command, an application-programming interface (API) command, a console command, a graphical user interface (GUI) command, a macro command, a Web services command, a Simple Network Management Protocol (SNMP) command, an Intelligent Platform Management Interface (IPMI) command, or a combination thereof.

19. The infrastructure management device of claim 15 wherein the at least one IT device neutral user interface command is configured to extend functionality of one or more IT devices of the multitude of IT devices.

20. The infrastructure management device of claim 15 wherein the at least one IT device neutral user interface command is configured to extend functionality of at least one command for one or more IT devices of the multitude of IT devices.

* * * * *